United States Patent
Sauermann

(10) Patent No.: US 7,574,676 B2
(45) Date of Patent: Aug. 11, 2009

(54) TREE LISTS USING MULTIPLE LINE STRUCTURES

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 615 days.

(21) Appl. No.: 10/851,011

(22) Filed: May 21, 2004

(65) Prior Publication Data

US 2005/0262452 A1 Nov. 24, 2005

(51) Int. Cl.
G06F 3/048 (2006.01)
(52) U.S. Cl. .................. 715/853; 715/854; 715/855
(58) Field of Classification Search .......... 715/853–855
See application file for complete search history.

(56) References Cited

U.S. PATENT DOCUMENTS

| | | | | |
|---|---|---|---|---|
| 5,239,647 A | * | 8/1993 | Anglin et al. | 707/205 |
| 6,151,024 A | * | 11/2000 | Alimpich et al. | 715/854 |
| 6,418,400 B1 | * | 7/2002 | Webber | 703/22 |
| 6,526,399 B1 | * | 2/2003 | Coulson et al. | 707/1 |
| 6,544,294 B1 | * | 4/2003 | Greenfield et al. | 715/234 |
| 2004/0268229 A1 | * | 12/2004 | Paoli et al. | 715/508 |

OTHER PUBLICATIONS

IBM TBD Tree Navigator—A Concept for Navigation in Big Trees Aug. 13, 2001.*
Microsoft Windows Explorer Version 5.1 Service Pack 1 Copyright 1981-2001 Microsoft Corporation.*
Compona Compona Grid Wayback marchine archive date Feb. 19, 2004 http://www.compona.com/wikiengine/wikipageviewer.ascx?ID=48.*

* cited by examiner

*Primary Examiner*—Doug Hutton
*Assistant Examiner*—Andrea N Long
(74) *Attorney, Agent, or Firm*—Kenyon & Kenyon LLP

(57) ABSTRACT

A method is provided for displaying data organized in a tree list including nodes. The method includes assigning to each node in the tree list a line structure identifying attributes of the node to be displayed; displaying at least two nodes having different line structures in a display area; and, for each of the at least two nodes, displaying, in the display area, the attributes of the node identified by the assigned line structure. The method may include displaying line structures for groups of nodes. The various displays of nodes, attributes and line structures my be altered and activated based on user input, such as selection or other indication of a particular node.

23 Claims, 7 Drawing Sheets

TREE LISTS USING MULTIPLE LINE STRUCTURES

FIELD OF THE INVENTION

The present invention relates to computer software. More particularly, the present invention relates to a method of displaying data.

BACKGROUND INFORMATION

In conventional software systems, some transactions display data for the user in the form of a hierarchical list called a tree. The tree structure may appear on the left side of the transaction window and a corresponding list may be displayed in tabular form on the right side of the window.

FIG. 1 shows an example of a tree list displaying flight information. Display 10 includes tree list display area 11, which shows a tree list, and data display area 12, which shows flight data in tabular form. Displayed in tree list display area 11 are the elements of a tree list including supernode 13.1, upper nodes 14.1, 14.2, 14.3, nodes 15.1, and leaves 16. Supernode 13.1, upper nodes 14.1, 14.2. 14.3, nodes 15.1, and leaves 16 are organized hierarchically, with each leaf 16 being assigned to a particular node 15.1, each node 15.1 being assigned to a particular upper node 14.3, and each upper node 14.3 being assigned to a particular supernode 13.1. The hierarchy of the tree list is displayed in tree list display area 11. Supernodes 13.1, upper nodes 14.1, 14.2, 14.3, nodes 15.1, and leaves 16 may also be referred to herein as folders and/or files. The user can open or close folders in the tree by clicking on the triangles beside the tree nodes. Clicking on this triangle causes the corresponding branches in the tree to alternatively appear or disappear from view. Data display area 12 is bordered on the top by header display 17. Alternatively, header display 17 may be situated on the bottom of display area 12. Header display 17 includes attributes 18.1, which identify the characteristic displayed in the column underneath each attribute 18.1. Each row under each column includes value 19.1, which represents data corresponding to the attribute identified by attribute 18.1 of the column for the corresponding folder or file.

The set of attributes associated with a particular folder or file is called a line structure or field catalog. Therefore, the line structure displayed for each folder or file corresponds to the header being displayed in header display 17. In conventional software systems, tree lists are subject to the restriction that, for each node, the lines displayed on the right in tabular form must all have the same line structure. The display does not support different, individual line structures for each line. Technically, this restriction is based on the fact that, in conventional systems, only one field catalog may be assigned to a tree list. A field catalog is metadata that describes the line structure of the list. A field catalog may contain information about the list columns such as column headers, highlighting colors, key field flags, column width, the order in which information appears on the screen, whether or not the information is sorted and in which order (ascending or descending), flags for showing or hiding columns, etc.

Because of the restriction to one field catalog, tree lists containing lines with line structures that differ from each other either cannot be displayed at all or must use a work-around. A typical work-around assigns the field names to leaf nodes of the tree (at the deepest level in the hierarchy) and shows a single column of values on the right side of the screen.

FIG. 2 shows such a work-around for the display of technical information about a search engine running in a distributed environment. In FIG. 2, display area 10 is divided into two different areas for displaying information, namely tree list/header display area 21 and attribute display area 22. Tree list/header display area 21 includes vertical header 20, along with supernodes 13.2, upper nodes 14.1, 14.2, 14.3. nodes 15.2, 15.3, and leaves 16. Vertical header 20 includes attributes 18.2, 18.3, 18.4, 18.5, 18.6, arranged vertically. In attribute display area 22 in the row occupied by each attribute 18.2, 18.3, 18.4, 18.5, 18.6 is a corresponding value 19.2, 19.3, 19.4, 19.5, 19.6, 19.7, which is associated with the file or folder directly above vertical header 20, though alternative configurations may be possible. Due to the vertical orientation of vertical header 20, only one value is displayed in each row of attribute-display-area 22, and therefore less data is displayed in display 10.

For example, attribute 18.2 (active) of upper node 14.4 (the namesever running on port 8355) is displayed below and indented from upper node 14.4. This is similar to the display method for a node with respect to an upper node (for example, the relation between "queueserver: 8352" (upper node 14.5) and "queue" (node 15.2)). Attribute 18.2 (active) of upper node 14.4 (nameserver: 8355) is associated with (i.e., is displayed on the same row as) value 19.2 (yes). Attribute-display-area 22 includes only one column 23, which is named "Value". Similarly, attribute 18.3 "active", attribute 18.4 "read_accesscounter", attribute 18.5 "write_accesscounter", and attribute 18.6 "backup_accesscounter" of upper node 14.6 entitled "indexserver: 8351" are not columns in a row (as in FIG. 1) but are displayed vertically. This configuration for displaying attributes is similar to the display of nodes 15 2, 15.3 (e.g., node 15.2 "queue" and node 15.3 "index") included within upper node 14.5 entitled "queueserver: 8352". Attribute 18.3 entitled "active", attribute 18.4 "read_accesscounter", attribute 18.5 "write_accesscounter", and attribute 18.6 "backup_accesscounter" of upper node 14.6 entitled "indexserver: 8351" correspond to value 19.3 "yes", value 19.4 "119", value 19.5 "2783", value 19.6 "0", respectively, in column 23 of attribute display area 22.

In order to circumvent the technical restrictions of the tree lists, headers 17 may be displayed as vertical headers 20, thereby occupying a large number of lines. This may make tree lists very long. The user may need to scroll down many pages to access information located in different parts of a tree list.

There thus is a need for an improved method of displaying tree lists.

SUMMARY

A method is provided for displaying data organized in a tree list including nodes. The method includes assigning to each node in the tree list a line structure identifying attributes of the node to be displayed; displaying at least two nodes having different line structures in a display area; and, for each of the at least two nodes, displaying, in the display area, a value for each of the attributes of the node identified by the assigned line structure.

The method may further include forming at least one common node group from nodes having identical line structures and displaying the at least one common node group and the value for each of the attributes of the nodes of the at least one common node group in a region of the display area.

The method may further include displaying the line structure for each of the at least one common node group above the common node group.

The method may further include displaying the line structure for each common node group above the common node group when a cursor is positioned over the region.

The method may further include highlighting the region when the cursor is positioned over the region.

The method may further include displaying the line structure for each common node group in a header display area.

The method may further include assigning each node to an upper node and displaying together in the display area each node associated with a respective upper node.

The line structure in the method may include a field catalog.

In the method, the nodes may be displayed in a column.

In the method, the values for each of the attributes may be displayed in a row for each node.

A system is provided for displaying data organized in a tree list including nodes. The system includes a processor adapted to assign to each node in the tree list a field catalog identifying attributes of the node to be displayed and a display adapted to display in a display area at least two nodes having different field catalogs and, for each of the at least two nodes, a value for each of the attributes of the node identified by the assigned field catalog.

The system may further include a memory for storing the tree list, the assigned field catalog for each respective node, and/or the value for each of the attributes of each node.

A computer program stored on a memory configured to be executed by a computer is provided. The computer program may include program code for executing a method for displaying data organized in a tree list including nodes. The method includes the steps of assigning each node to a header structure including attributes; displaying at least two nodes assigned to different header structures in a display area; and, for each of the at least two nodes, displaying, in the display area, a value for each of the attributes of the node corresponding to the assigned header structure.

In the computer program, the method may further include displaying the header structure for at least one of the at least two nodes.

In the computer program, all nodes having a same header structure may be displayed in a group.

In the computer program, the method may further include displaying the header structure above the group of all nodes having the same header structure.

In the computer program, the method may further include displaying the header structure above the group of all nodes having the same header structure when a cursor is positioned over the nodes and/or the values of the attributes of the group.

In the computer program, the method may further include displaying the header structure in a designated header area when a cursor is positioned over at least one of the nodes and/or the values of the attributes of the group.

DETAILED DESCRIPTION

According to an exemplary embodiment of the present invention, a method for displaying tree lists is provided. The method allows files and folders that have different field catalogs to be displayed efficiently. The values for the different field catalogs are displayed in a display area. The header structure identifying the attributes of the field catalog may be displayed above files or folders having a common line structure or may be displayed above the line structure when the user points at the values with a cursor. Alternatively, the header structure may be displayed in a designated header position when the user points at the values with a cursor, or in any other appropriate alternative manner.

Figure 1:
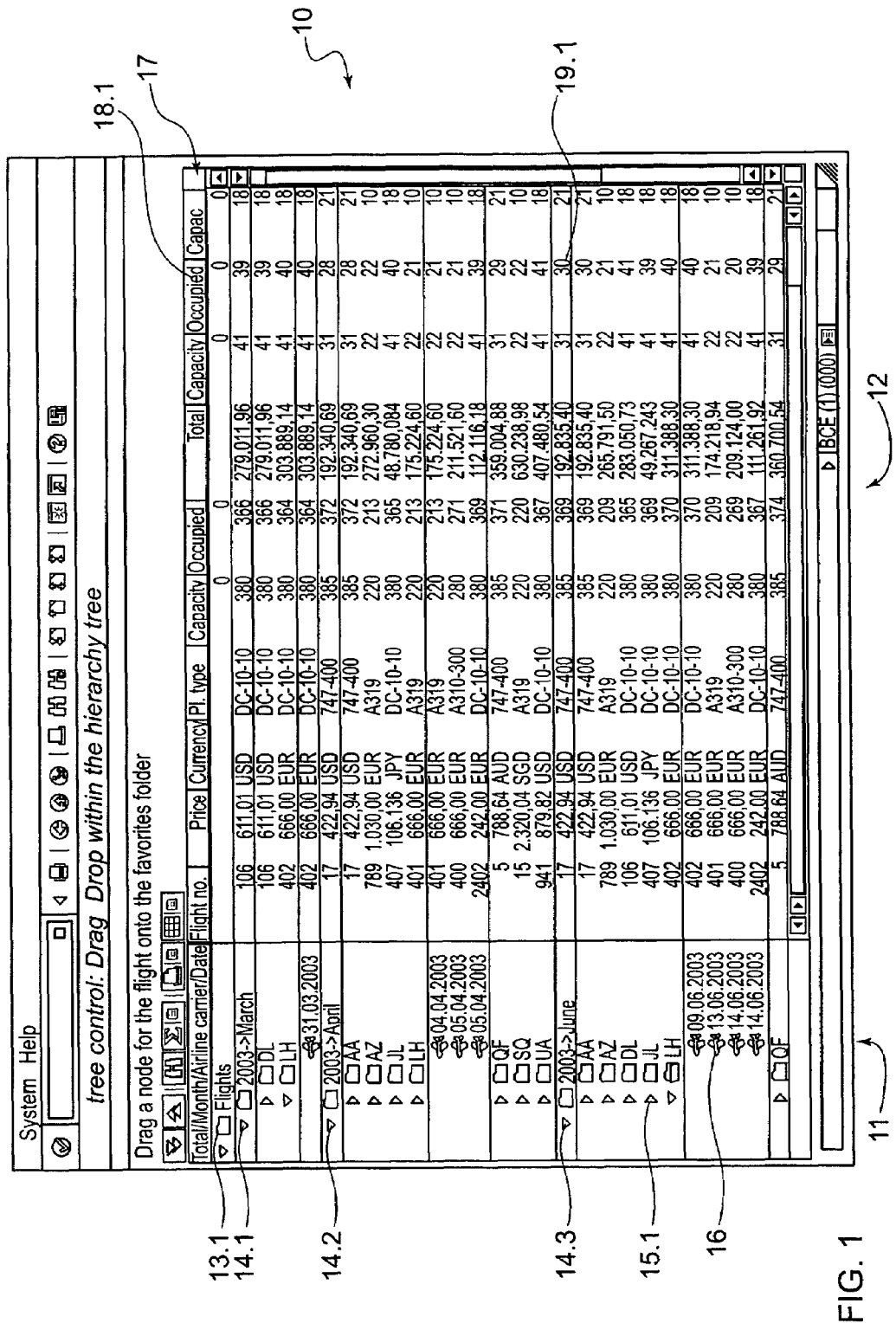
FIG. 1 illustrates a conventional tree list in a system displaying flight information.
Figure 2:
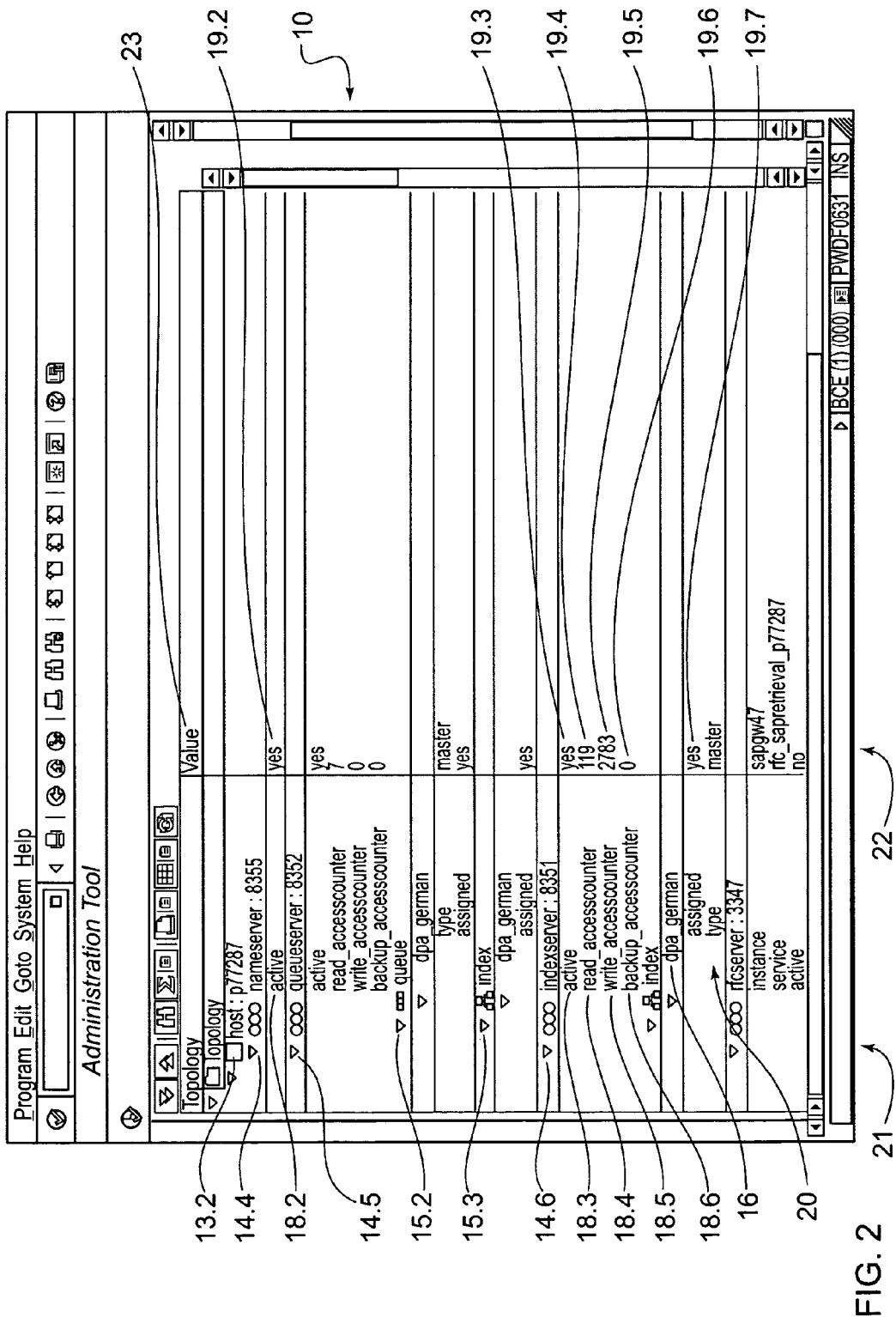
FIG. 2 illustrates a display of technical information for a search engine running in a distributed environment in which the tree list is displayed using a work-around.
Figure 3:
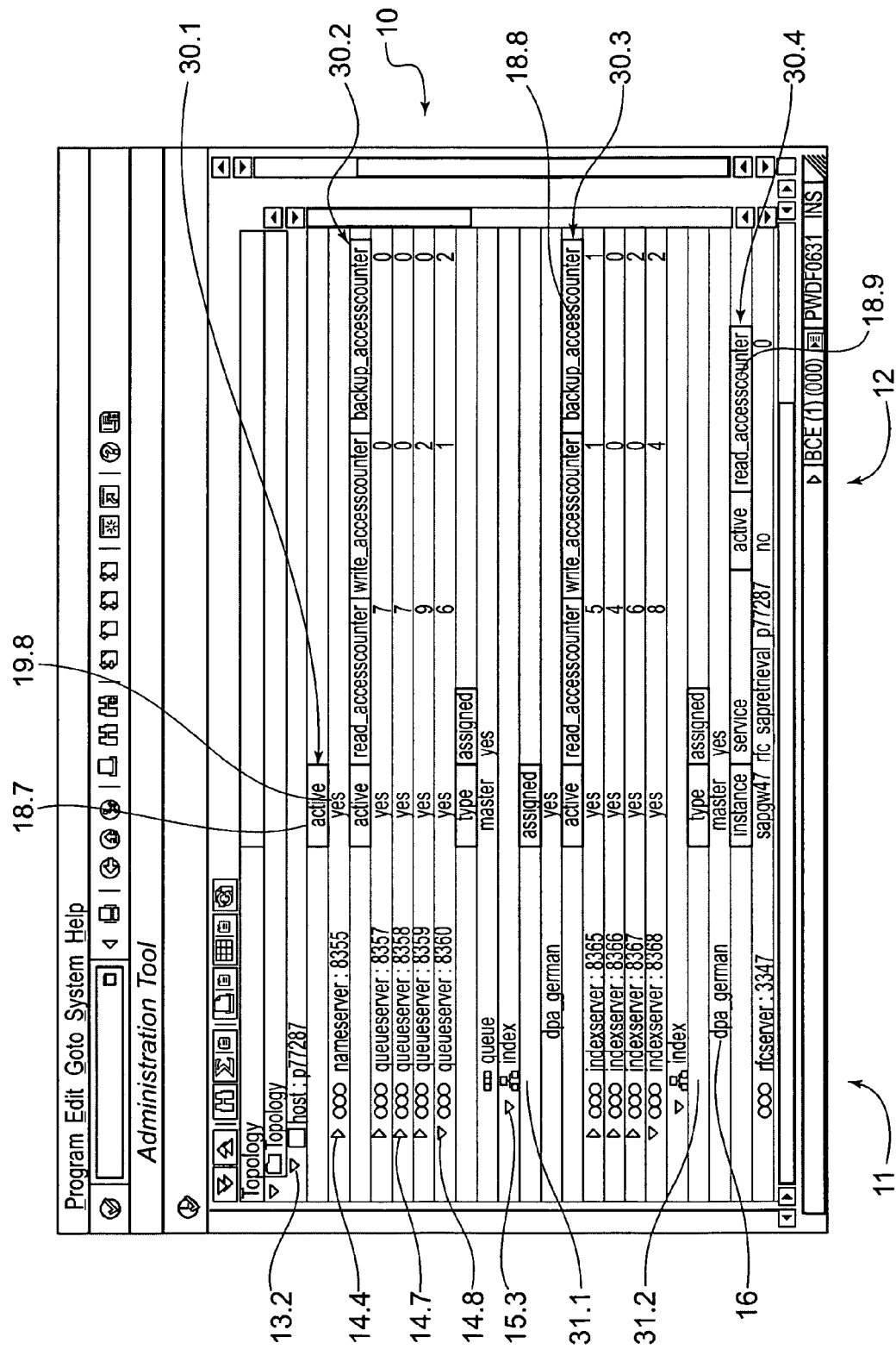
FIG. 3 illustrates an exemplary embodiment of the present invention showing a tree list allowing for multiple line structures.

FIG. 3 shows a proposed new version of the tree list of FIG. 2 illustrating an exemplary embodiment of the present invention. Display 10 includes tree list display area 11, which shows a tree list, and data display area 12, which shows server data. Displayed in tree list display area 11 are the elements of a tree list including supenode 13.2, upper nodes 14.4, 14.7, 14.8, nodes 15.3, and leaves 16. Supenode 13.2, upper nodes 14.4, 14.7, 14.8, nodes 15.3, and leaves 16 are organized hierarchically, with each leaf being assigned to a particular node, each node being assigned to a particular upper node, and each upper node being assigned to a particular supenode 13.2. The hierarchy of the tree list is displayed in tree list display area 11. The user can open or close folders in the tree by clicking on the triangles beside the tree nodes. This causes the corresponding branches in the tree to appear or disappear from view.

Some of the elements of the tree list supenode 13.2, upper nodes 14.4, 14.7, 14.8, nodes 15.3, and leaves 16) may have different line structures. For example, upper node 14.4 entitled "nameserver: 8355" has a line structure including only one value 19.8 entitled "yes" in attribute 18.7 entitled "active". Therefore, attribute 18.7 of upper node 14.4 entitled "nameserver: 8355" represents entire node-specific-header 30.1 for upper node 14.4 entitled "nameserver: 8355". On the other hand, upper node 14.7 entitled "queueserver: 8358" has a line structure including four values ("yes", "7", "0", "0") in four attributes ("active", "read_accesscounter", "write_accesscounter", "backup_accesscounter"). These four attributes ("active", "read_accesscounter", "write_accesscounter", "backup_accesscounter") of upper node 14.7 entitled "queueserver: 8358" together form node-specific-header 30.2 for upper node 14.7. Similarly, other node-specific headers 30.3, 30.4 have structures including values such as values 18.9 of header 30.4.

Therefore, some elements of the displayed tree list may have different line structures than other elements of the tree list. In an exemplary embodiment of the present invention, multiple line structures may be assigned to the tree list control in the form of multiple field catalogs. The information "yes" (value 19.8) for the "active" (attribute 18.7) for the folder "nameserver: 8355" (upper node 14.4) appears entirely in the list part, and does not appear in the tree part of the tree list (as compared with FIG. 2). A single column with header "active" (for attribute 18.7) is created and the value "yes" (for value 19.8) is assigned to the column field belonging to the "nameserver: 8355" line (for upper node 14.4). The column stops here, since on the following line the headers for the next line structure appears.

Data display area 12 includes several node-specific-headers 30.1, 30.2, 30.3, 30.4 that are each situated above values for folders or files having a common line structure. The node-specific headers may be positioned in a rows 31.1, 31.2 below the corresponding nodes as shown. Node-specific-headers include attributes which identify the characteristic displayed in the colunm underneath each attribute. Each row under each column includes a value which represents data corresponding to the attribute identified by the attribute of the column for the corresponding folder or file.

In contrast to FIG. 2, the display in FIG. 3 shows that four queueservers are running, using different port numbers. The information displayed for these four tree folders (or upper nodes 14.4, 14.7, 14.8) has a common line structure in the list part. Therefore, a subtable containing four lines appears in the data display area. Attributes 18.8 for the four columns ("active", "read_accesseounter", "write_accesscounter", "backup_accesscounter") appear only once for the four lines. The information displayed for the other tree nodes (folders or files) may be interpreted in a similar way. Additionally, upper node 14.8 entitled "queueserver: 8360" has been opened to display subordinate levels of the tree hierarchy including node 15.3, and the corresponding attributes of these nodes 15.3 are also displayed in data display area 12.

Note that in FIG. 3, four queueserver nodes and four indexserver nodes are displayed, yet the list is still shorter than the list in FIG. 2, in which only one queueserver node 14.5 and one indexserver node 14.6 are displayed. More information may be displayed in display area 10, with the result that the user may need to scroll less often and for shorter distances to access information contained in other parts of the tree list.

Figure 4:
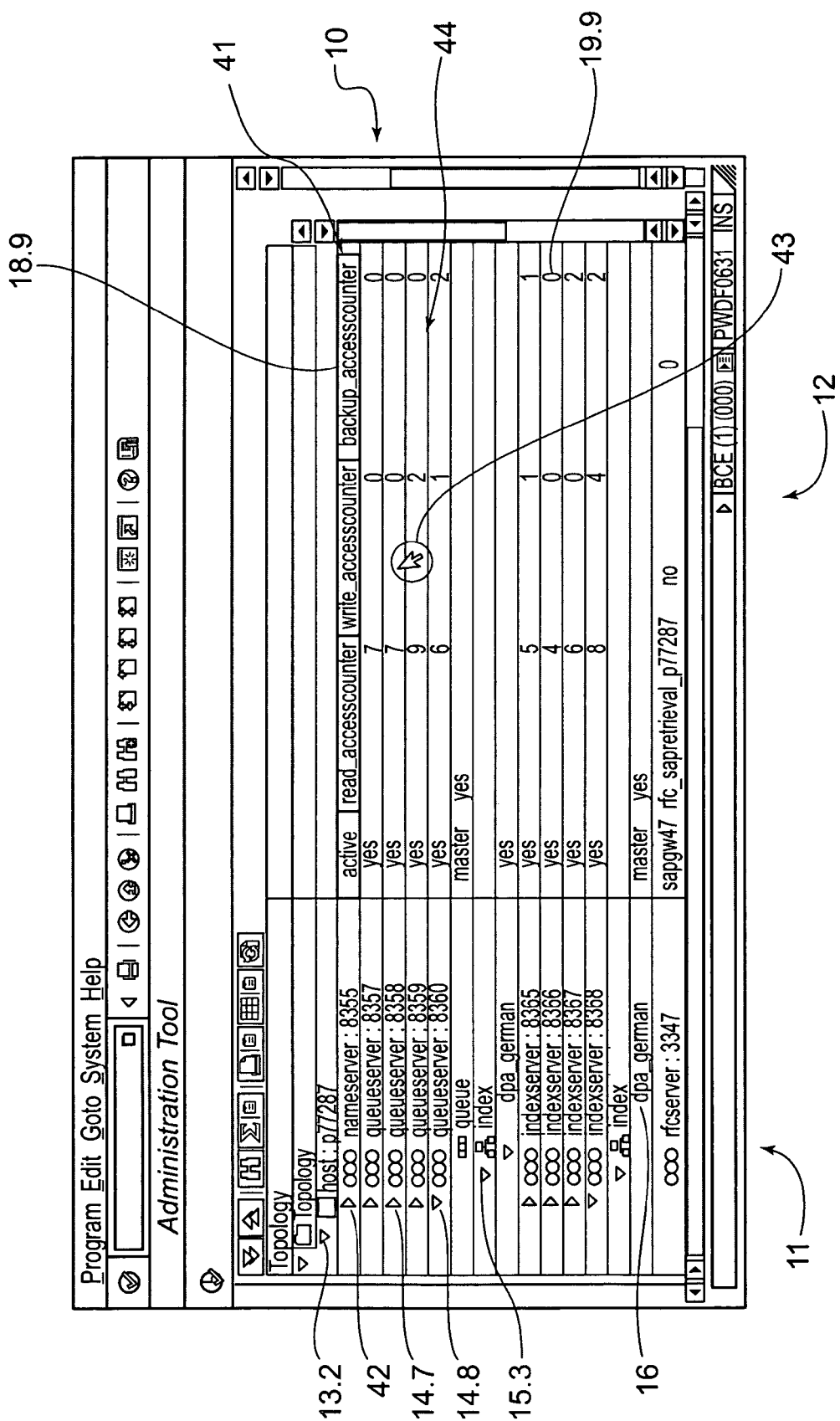
FIG. 4 illustrates an alternative exemplary embodiment of the present invention using column headers appearing as a tooltip as the user moves the cursor over the different list lines.

FIG. 4 shows an alternative exemplary embodiment of the present invention that may improve the space-saving characteristics of the invention. In FIG. 4, the column headers are not displayed initially. The column headers appear as field-specific-header 41 when the user moves cursor 43 over common-field-catalog-region 44, in a similar fashion to a tooltip. The principle of tooltips is conventional in graphical user interfaces. For example, in some applications, little yellow signs may appear when the user moves cursor 43 over a button. The sign may give an explanation of the functionality that is triggered when the button is activated.

The screen shown in FIG. 4 displays field-specific-header 41 that corresponds to a line structure of the nodes that have values being pointed at by cursor 43. In FIG. 4, the user has moved cursor 43 to values in a common-field-catalog-region 44 associated with a group of upper nodes 14.7, 14.8 (queueserver nodes). Since all nodes associated with common-field-catalog-region 44 have the same line structure in data display area 12, field-specific-header 41 associated with this line structure is displayed just above the first queueserver line. The line information for node-with-hidden-values 42 (called upper node "nameserver" when cursor 43 is not positioned in the particular common-field-catalog-region 44 indicated in FIG. 4) is then temporarily hidden. Values for the appropriate nodes (such as values 19.9 of node "indexserver: 8366) are displayed in the common-field-catalog-region 44.

Figure 5:
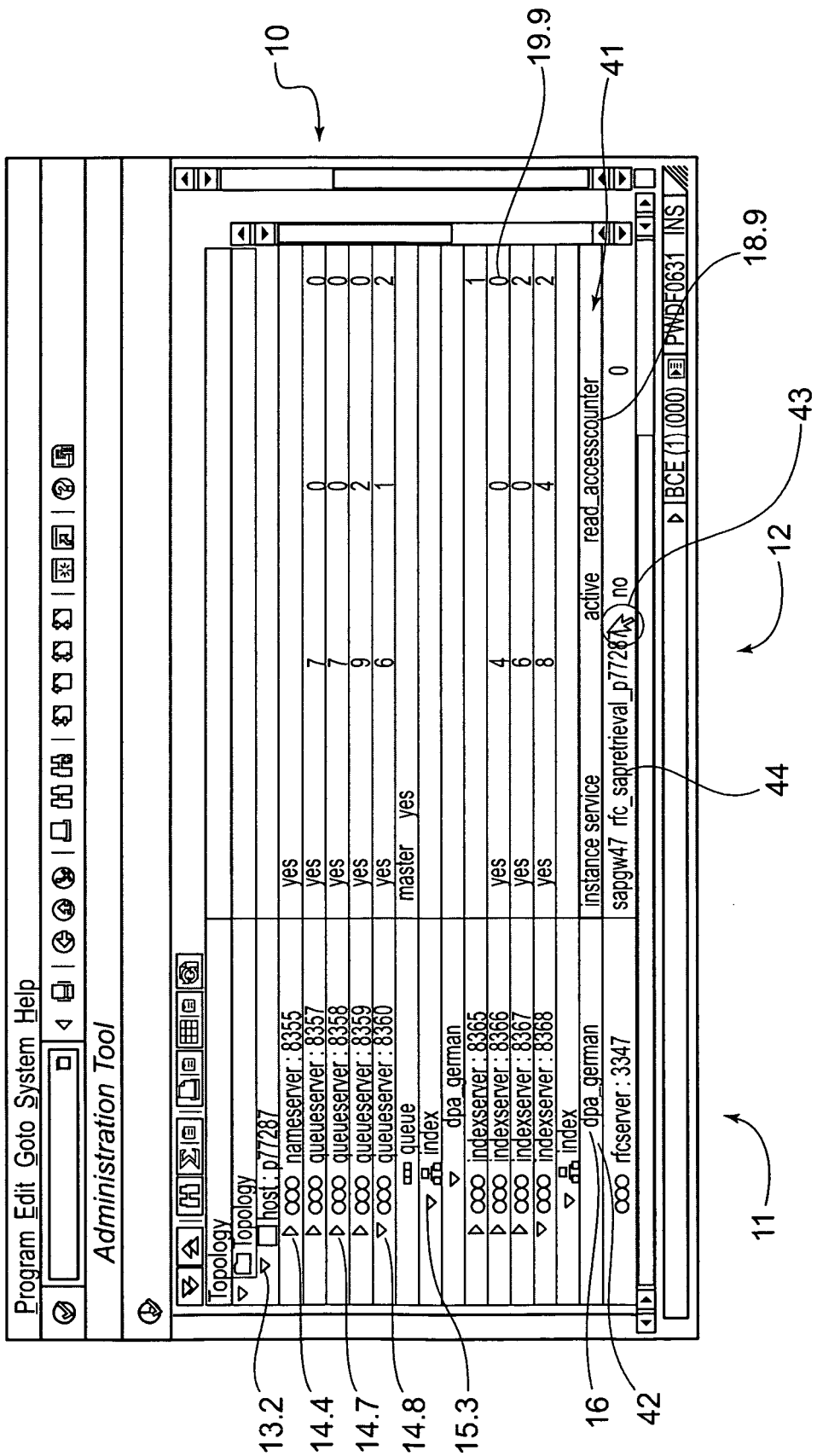
FIG. 5 illustrates the alternative exemplary embodiment of the present invention shown in FIG. 4 with the cursor moved to a different line.

The principle shown in FIG. 4 for the group of queueserver lines may apply to all other lines in this exemplary embodiment in the same manner. For example, FIG. 5 shows the appearance of the screen when the user moves cursor 43 to common-field-catalog-region 44 associated with "rfcserver". In this situation, common-field-catalog-region 44 has only one line, and node-with-hidden-values 42 corresponds to leaf 16 ("dpa_german"). Field-specific-header 41 is written over the values associated with leaf 16 ("dpa_german") while cursor 43 is positioned over common-field-catalog-region 44. Other header information is not displayed, while values, possibly having different line structures, are displayed.

Figure 6:
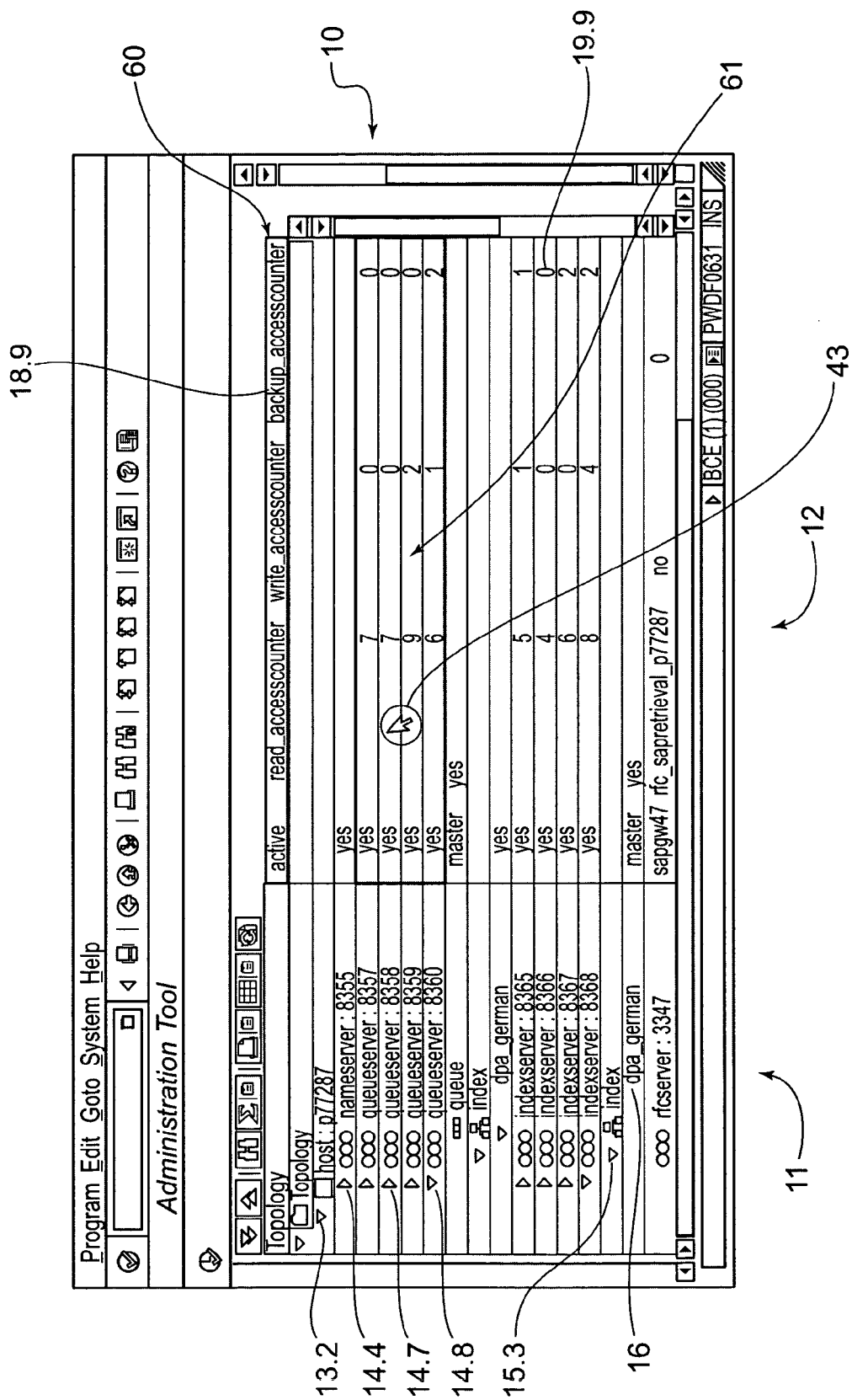
FIG. 6 illustrates an alternative exemplary embodiment of the present invention in which the tooltip is displayed in a designated part of the screen, as a type of dynamical list header.

FIG. 6 shows another exemplary embodiment of the present invention. In FIG. 6, the tooltip-style header is central-field-specific-header 60, which displays the list header for a list line, or a group of list lines, to which cursor 43 has been moved, at a fixed position in the window. For example, central-field-specific-header 60 may be positioned at the top of data display area 12. As cursor 43 is moved over the list lines, the corresponding line headers appear as central-field-specific-header 60, but always at the top of the whole list (the top of data display area 12) and not directly above the line or group of lines indicated by cursor 43. This implementation may be seen as a dynamical list header that changes according to the position of cursor 43. Alternatively, central-field-specific-header 60 may be displayed in a special status line of the window, or in any other appropriate place.

Optionally, the line or the group of lines to which the currently displayed list header corresponds may appear highlighted, as shown in FIG. 6 in highlighted-common-field-catalog-region 61. The highlighting feature may also be used in the exemplary embodiments shown in FIGS. 4 and 5.

An alternative exemplary embodiment provides that, when the user clicks on highlighted-common-field-catalog-region 61, then highlighted-common-field-catalog-region 61 becomes highlighted and remains highlighted independent from where the user moves cursor 43 next. In this alternative exemplary embodiment, only when the user clicks cursor 43 on another list line or group of list lines of a different highlighted-common-field-catalog-region 61 will the other lines become highlighted. In other words, highlighting does not respond to "mouse-over" events but only to "mouse-click" events.

Figure 7:
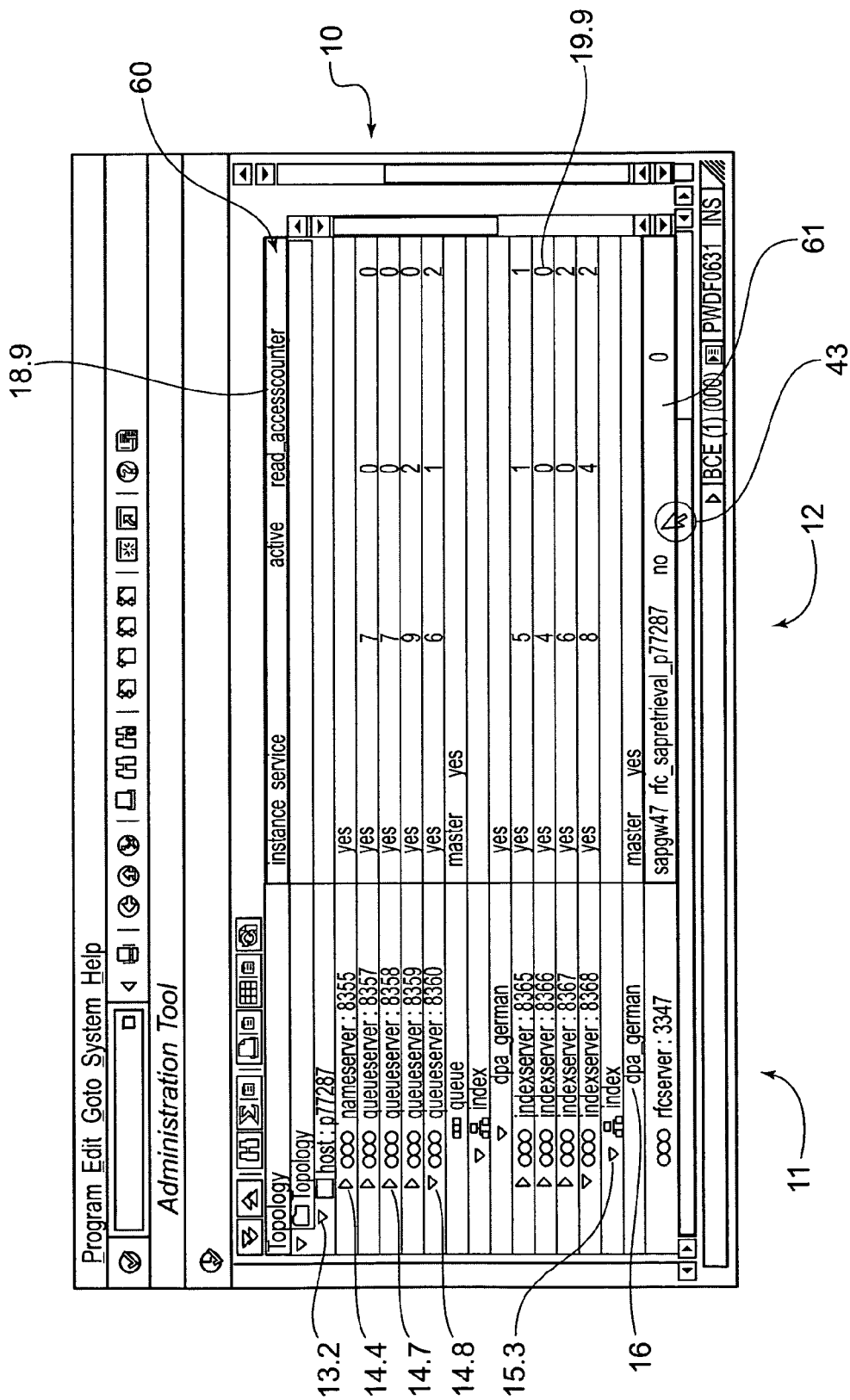
FIG. 7 illustrates the alternative exemplary embodiment of the present invention shown in FIG. 6 except that the user has moved the cursor to another line.

FIG. 7 shows the alternative exemplary embodiment shown in FIG. 6, except now the user has moved cursor 43 to a line of highlighted-common-field-catalog-region 61 associated with the rfcserver.

In summary, an exemplary embodiment of the present invention provides for the usage of multiple line structures in tree lists, as appropriate for the data to be displayed. Technically, this may be implemented by assigning a field catalog to each of the nodes of the tree structure in a tree list, instead of the conventional practice of assigning a single field catalog to the whole tree list.

Three versions of the invention have been discussed: static list line headers (FIG. 3); list line headers as tooltips located on a line above the lines indicated by the cursor (FIGS. 4 and 5); and dynamic list line headers located in a designated position at the top of the list display area (FIGS. 6 and 7). While the present invention has been described in connection with the foregoing representative embodiment, it should be readily apparent to those of ordinary skill in the art that the representative embodiment is exemplary in nature and is not to be construed as limiting the scope of protection for the invention as set forth in the appended claims.

What is claimed is:

1. A method for displaying data organized in a hierarchical tree including nodes, each node in the tree identifying attributes of the node to be displayed, the method comprising:
reading attributes for nodes to be displayed in a current display view;

displaying the hierarchical tree in a table in a list view, wherein each node is displayed with respective attributes, nodes with identical attributes are grouped in node groups and displayed in continuously adjacent rows and at least two nodes having different attributes are displayed; and responsive to a click on a node, displaying attribute headings for a node in the table, wherein the attribute headings are displayed in a row above respective continuously adjacent rows of identical attributes when the node is one node of a node group with identical attributes, and the attribute headings are displayed in a row above the attributes of the node when the node is a single node and not one of a node group with identical attributes.

2. The method according to claim 1, further comprising: assigning to each node in the tree a line structure identifying attributes of the node to be displayed.

3. The method according to claim 1, further comprising: categorizing nodes into super nodes, upper nodes, normal nodes and leaves;

assigning, respectively, each leave to a normal node, each normal node to an upper node and each upper node to a super node; and displaying a hierarchical structure indicating the assignment of each node to a respective parent node in the list view.

4. The method according to claim 1, wherein attributes for a node are selected from a field catalog, the field catalog including a set of attributes.

5. The method according to claim 1, wherein the nodes are displayed in a column.

6. The method according to claim 1, wherein the row of attribute headings is displayed in a designated header area of the table.

7. A method for displaying data organized in a hierarchical tree including nodes, each node in the tree identifying attributes of the node to be displayed, the method comprising:
reading attributes for nodes to be displayed in a current display view;

displaying the hierarchical tree in a table in a list view, wherein each node is displayed with respective attributes, nodes with identical attributes are grouped in node groups and displayed in continuously adjacent rows and at least two nodes having different attributes are displayed; and responsive to positioning a cursor over a region, the region being covered by a node group or by a single node not belonging to a node group, displaying attribute headings for a node in the table, wherein the attribute headings are displayed in a row above respective continuously adjacent rows of identical attributes when the node is one node of a node group with identical attributes, and the attribute headings are displayed in a row above the attributes of the node when the node is a single node and not one of a node group with identical attributes.

8. The method according to claim 7, further comprising highlighting the region when the cursor is positioned over the region.

9. The method according to claim 7, wherein the row of attribute headings is displayed in a row immediately above the continuously adjacent rows of the node group if the region is covered by a node group, or immediately above the single node if the region is covered by a single node.

10. The method according to claim 7, further comprising: assigning to each node in the tree a line structure identifying attributes of the node to be displayed.

11. The method according to claim 7, further comprising: categorizing nodes into super nodes, upper nodes, normal nodes and leaves;

assigning, respectively, each leave to a normal node, each normal node to an upper node and each upper node to a super node; and displaying a hierarchical structure indicating the assignment of each node to a respective parent node in the list view.

12. The method according to claim 7, wherein attributes for a node are selected from a field catalog, the field catalog including a set of attributes.

13. The method according to claim 7, wherein the nodes are displayed in a column.

14. The method according to claim 7, wherein the row of attribute headings is displayed in a designated header area of the table.

15. A computer-readable storage medium storing a plurality of instructions which, when executed by a processor, cause the processor to perform a method comprising:
assigning each node in a tree to a header structure, the header structure listing attributes of the assigned nodes;

displaying at least two nodes assigned with different header structures in a table, the at least two nodes to be displayed in common node groups with all other nodes having a same assigned header structure respectively;

for each of the at least two nodes, displaying, in the table, a value for each of the attributes of the node corresponding to the assigned header structure; and in response to a user action, displaying an attribute heading row for one of the different header structures, wherein the user action is one of moving a cursor over a region covered by a node, or clicking on the region covered by the node, and the attribute heading row being displayed is a respective header structure for the node.

16. The computer-readable storage medium of claim 15, wherein the attribute heading row is displayed in a designated header area of the table.

17. The computer-readable storage medium of claim 15, wherein the attribute heading row is displayed immediately above the node.

18. A computer-readable storage medium storing a Plurality of instructions which, when executed by a processor, cause the processor to perform a method comprising:
assigning each node in a tree to a header structure, the header structure listing attributes of the assigned nodes;

displaying at least two nodes assigned with different header structures in a table, the at least two nodes to be displayed in common node groups with all other nodes having a same assigned header structure respectively;

for each of the at least two nodes, displaying, in the table, a value for each of the attributes of the node corresponding to the assigned header structure; and in response to a user action, displaying an attribute heading row for one of the different header structures, wherein the user action is clicking in or moving a cursor over a region covered by a node, the node is one among a common node group with same assigned header structure, the attribute heading row is displayed immediately above rows displaying the group of nodes.

19. The computer-readable storage medium of claim 17, wherein the attribute heading row is displayed in a designated header area of the table.

20. The computer-readable storage medium of claim 18, wherein the attribute heading row is displayed immediately above the node.

21. A computer-readable storage medium storing a plurality of instructions which, when executed by a processor, cause the processor to perform a method comprising:
 assigning each node in a tree to a header structure, the header structure listing attributes of the assigned nodes;
 displaying at least two nodes assigned with different header structures in a table, the at least two nodes to be displayed in common node groups with all other nodes having a same assigned header structure respectively;
 for each of the at least two nodes, displaying, in the table, a value for each of the attributes of the node corresponding to the assigned header structure; and in response to a user action, displaying an attribute heading row for one of the different header structures, wherein the user action is clicking in or moving a cursor over a region covered by a common node group with same assigned header structure, the attribute heading row is displayed immediately above rows displaying the group of nodes.

22. The computer-readable storage medium of claim 21, wherein the attribute heading row is displayed in a designated header area of the table.

23. The computer-readable storage medium of claim 21, wherein the attribute heading row is displayed immediately above the node.

* * * * *

UNITED STATES PATENT AND TRADEMARK OFFICE
CERTIFICATE OF CORRECTION

PATENT NO. : 7,574,676 B2  Page 1 of 1
APPLICATION NO. : 10/851011
DATED : August 11, 2009
INVENTOR(S) : Volker Sauermann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this

Seventh Day of September, 2010

David J. Kappos
*Director of the United States Patent and Trademark Office*